United States Patent [19]

Gornowicz et al.

[11] Patent Number: 4,990,360

[45] Date of Patent: Feb. 5, 1991

[54] ELECTRICALLY CONDUCTIVE COMPOSITIONS CONTAINING ACRYLATE FUNCTIONAL ORGANOSILOXANE/OXYALKYLENE COPOLYMERS AND SOLUBILIZED LITHIUM SALT

[75] Inventors: Gerald A. Gornowicz; Chi-Long Lee, both of Midland, Mich.

[73] Assignee: Dow Corning Corporation, Midland, Mich.

[21] Appl. No.: 414,541

[22] Filed: Sep. 29, 1989

Related U.S. Application Data

[62] Division of Ser. No. 281,589, Dec. 9, 1988, Pat. No. 4,906,718.

[51] Int. Cl.$^5$ ............................................. B05D 3/06
[52] U.S. Cl. ............................ 427/35(139); 427/54.1; 524/392; 524/401; 524/417; 524/420; 522/99
[58] Field of Search ............... 524/392, 401, 417, 420; 522/99; 427/54.1, 35

[56] References Cited

U.S. PATENT DOCUMENTS

| | | | |
|---|---|---|---|
| 3,560,544 | 2/1971 | Haluska | 260/448.2 |
| 3,703,489 | 11/1972 | Morehouse | 260/2.5 AH |
| 3,878,263 | 7/1974 | Martin | 528/14 |
| 3,957,843 | 5/1976 | Bennett | 260/448.2 B |

FOREIGN PATENT DOCUMENTS

| | | |
|---|---|---|
| 1023893 | of 0000 | Canada . |
| 60-216461 | of 0000 | Japan . |
| 59-224072 | of 0000 | Japan . |
| 59-230058 | of 0000 | Japan . |
| 217263 | 4/1984 | Japan . |

OTHER PUBLICATIONS

Polymer Comm., 27 (4), 98–100, 1986 Ha-1 et al.
Makromol. Chem., Rapid Comm. 7, 115–120, 1986, Fish et al.
Solid State Ionics, 15, 1985, 233–240, Bouridah et al.
J. Poly. Sci., Polymer Letters, 22 (12), 659–63, 1984, Nagaoka et al.
Office of Naval Research, Task No. NR 627-846, Report #5.

Primary Examiner—Melvyn I. Marquis
Assistant Examiner—Karen A. Hellender
Attorney, Agent, or Firm—Robert Spector

[57] ABSTRACT

This invention provides novel liquid organosiloxane/-graft-oxyalkylene copolymers that cure to yield solid materials. The copolymers can be cured by heating them in the presence of suitable curing agents, by exposure to ultraviolet radiation in the presence of a photoinitiator, or by exposure to an electron beam. The copolymers can be combined with solubilized, ionizable lithium salts to yield curable electroconductive compositions suitable for use as electrolytes in storage batteries.

4 Claims, No Drawings

ELECTRICALLY CONDUCTIVE COMPOSITIONS CONTAINING ACRYLATE FUNCTIONAL ORGANOSILOXANE/OXYALKYLENE COPOLYMERS AND SOLUBILIZED LITHIUM SALT

This is a divisional of co-pending application Ser. No. 281,589 filed on Dec. 9, 1988 now U.S. Pat. No. 4,906,718.

BACKGROUND OF THE INVENTION

1. Field of the Invention

This invention pertains to organosiloxane/oxyalkylene copolymers. More particularly, this invention pertains to polyorganosiloxanes containing pendant oxyalkylene units that are terminated with an acrylate group. The copolymers are curable by ultraviolet or electron beam radiation and are particularly useful as electrolytes in conjunction with solubilized, ionizable lithium salts.

2. Description of the Prior Art

Organosilocane/oxyalkylene copolymers containing divalent siloxane units corresponding to the general formula RGSiO are known in the art. In this formula R typically represents a monovalent hydrocarbon radical or a substituted monovalent hydrocarbon radical and G represents a sequence of at least two oxyalkylene groups such as oxyethylene or oxypropylene that are bonded to the silicon atom by means of an alkylene radical. The sequence can be terminated with a hyroxyl group, an alkoxide group or a group of the formula —O(O)CR', where R' represents a monovalent hydrocarbon radical that is free of ethylenic unsaturation.

U.S. Pat. No. 3,703,489, which issued to Morehouse on Nov. 21, 1972 describes silane/oxyalkylene block copolymers wherein from 15 to 60 weight percent of the oxyalkylene units are oxyethylene and the remainder are oxypropylene. The sequences of oxyalkylene units are terminated with an alkoxy group containing from 1 to 10 carbon atoms.

The sequence of oxyethylene units in the siloxane/oxyethylene copolymers disclosed in U.S. Pat. No. 3,560,544, which issued to Haluska on Feb. 2, 1971 are bonded to silicon through an alkylene group and are terminated by groups of the formula —OC(O)R[-C(O)OA]$_x$,' where A represents an amine group, an alkali metal or an alkaline earth metal, R represents a divalent or a trivalent hydrocarbon radical containing from 2 to 6 carbon atoms and x is 1 or 2.

U.S. Pat. No. 3,957,843, which issued to Bennett on May 18, 1976, discloses siloxane/oxyalkylene copolymers wherein A of the foregoing formula is hydrogen, a monovalent hydrocarbon radical free of ethylenic unsaturation, —OCNHR', —OCNH2, —OCR', or —O-COR', where R' represents an monovalent hydrocarbon radical that is free of aliphatic unsaturation.

Polyorganosiloxanes containing acrylate functional pendant groups of the formula —R'-'C—O(O)CCH=CH$_2$ bonded to at least a portion of the silicon atoms are described in U.S. Pat. No. 3,878,263, which issued to Martin in July 10, 1972. In this instance the acrylate group is bonded to silicon through a divalent hydrocarbon radical that can optionally contain an ether linkage. A sequence of oxyalkylene units is not mentioned as a possible candidate for the R" group.

The absence of acrylate or other ethylenically unsaturated terminal groups on many prior art siloxane/oxyalkylene copolymers is understandable, based on the intended use of these copolymers. Of the prior art references cited in the present specification that disclose siloxane/oxyalkylene copolymers, all of these references teach using the copolymers as surfactants for the preparation of polyurethane foams. These surfactants are intended to facilitate foam formation, and typically do not require the presence of ethylenically unsaturated hydrocarbon radicals.

The prior art pertaining to the use of organosiloxane/oxyalklyene copolymers as surfactants go as far as to specifically exclude the presence of ethylenically unsaturated carbon-to-carbon bonds, usually to avoid undesired side reactions during preparation of these copolymers. The copolymers are typically prepared by reacting a monallyl ether of the desired oxyalkylene polymer wit a polyorganohydrogensiloxane containing an average of at least one silicon-bonded hydrogen atom per molecule. The allyl or other ethylenically unsaturated hydrocarbon radical reacts with the silicon-bonded hydrogen atoms, and appear int he final product as an alkylene radicals.

Another known use for liquid polydiorganosiloxanes containing pendant polyoxyalkylene units is as electrolytes in solid state batteries containing ionizable lithium compounds. An article by Hall et al. [Polymer Communications, 27 (4), 98-100 (1986)] discloses copolymers prepared by the base catalyzed reaction between a polymethylhydrogensiloxane and ethylene glycol oligomers terminated on ne end by a methoxy group and on the other end by a hydroxyl group. The reaction product could be crosslinked by heating, and the conductivity was found to be inversely proportional to the degree of crosslinking.

For many applications, including solid state batteries, it is preferred if not a requirement that the electrolyte be a solid material. This can be achieved by curing the polymeric electrolyte either prior to or following addition of the ionizable lithium salt.

An article by Fish et al. [Makromol. Chem, Rapid Comm. 7, 115-120 (1986)] reports conductivity data for reaction products of a polymethylhydrogensiloxane and a methoxy-terminated polyethylene oxide. Lithium perchlorate was added to the copolymer before it was cured by heating in the presence of benzoyl peroxide.

An article by Bouridah et al. [Solid State Ionics, 15 (1985), 233-240] describes electrolytes prepared by adding lithium perchlorate to a dimethylsiloxane/-grafted ethylene oxide copolymer of the formula Me$_3$SiO(Me$_2$SiO)$_x$(MePEOSiO)$_y$SiCH$_3$ where Me represents methyl, the value of x is about 56, the average value of y is about 16 and PEO is —(CH$_2$CH$_2$O)$_{22}$—. The electrolyte is cured by reacting it with an isocyanate. The problem with this method for crosslinking the polymer is that urethane groups formed during the crosslinking reaction contain nitrogen-bonded active hydrogen atoms that can interfere with the electrochemical reactions occurring in batteries.

Japanese published application no. 217263/85 discloses the addition of lithium perchlorate to a cured polymer having repeating units of the formula

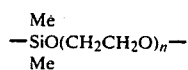

where Me represents methyl and the value for n not specified but is equivalent to a liquid polymer. The polymer is swollen using acetone prior to addition of the lithium salt.

Crosslinked polymers are typically undesirable as starting materials for preparing electrolytes because it is difficult to incorporate large amounts of ionizable salts into these materials even after the polymers are swollen using organic liquids such as acetone.

An article by Nagaka et al. [J Poly. Sci., Polymer Letters, 22 (12), 659–63, 1984] reports high ionic conductivity for uncured polymers having repeating units of the formula disclosed in the aforementioned Japanese published application and containing a solubilized lithium salt.

The present inventors have found that organosiloxane/osyethylene copolymers of the prior art containing solubilized lithium salts are often difficult to cure using organic peroxides or a hydrosilation reaction between silicon-bonded hydrogen atoms and lower alkenyl radicals such as vinyl. One aspect of the present invention resides in a class of organisolixane/oxythylene copolymers that do not have this disadvantage.

SUMMARY OF THE INVENTION

An objective of this invention is to provide liquid organosiloxane/oxyalkylene copolymers that cure in the presence of solubilized lithium salts to yield solid materials. These copolymers are particularly useful as electrolytes in solid state batteries. The copolymers can be cured by heating in the presence of organic peroxides or by exposing them to ultraviolet radiation.

DETAILED DESCRIPTION OF THE INVENTION

One aspect of the present invention relates to liquid, curable compositions comprising a copolymer having the general formula

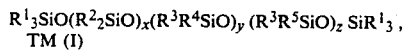
TM (I)

where $R^1$, $R^2$, and $R^3$ represent monovalent hydrocarbon or substituted monovalent hydrocarbon radicals, $R^4$ represents $-R^6O(CH_2CH_2O)_mA$, $R^5$ represents $-R^7O(CH_2CH_2O)_nC(O)CR^8=CLH_2$, $R^6$ and $R^7$ represent identical or different alkylene radicals containing from 2 to 12 carbon atoms, $R^8$ represents methyl or hydrogen, A represents an alkyl, aryl, or acyl radical, the values represented by m and n are from 4 to 30, the value represented by x is from 0 to 100, the value represented by y is from 0 to 100, the value represented by z is at least 2, and the value of $x+y+z$ is equivalent to a viscosity of up to 1 Pa.s at 25° C.

A second aspect of this invention provides improved electrolyte material for solid state batteries, where said electrolyte comprises a cured organosiloxane/ethylene oxide copolymer and a solubilized, ionizable lithium salt. The improvement comprises (1) the presence as said copolymer of a liquid copolymer exhibiting the general formula

where $R^1-R^5$, x, y and z are as defined previously and (2) a molar ratio of $CH_2CH_2O$ units to lithium salt of from 7 to 30.

The copolymers of this invention can be prepared using prior art methods for preparing diorganosiloxane/graftethylene oxide copolymers. Typically a diorganosiloxne/organohydrogensiloxane copolymer corresponding copolymer corresponding to the formula

 (II)

is reacted with at least one of two classes of liquid polyethylene oxides (also referred to herein as polyethylene glycols) containing one ethylenically unsaturated terminal group. The first class is terminated on one end with a triorganosiloxy group and corresponds tot he formula

 (III)

The second class of polyethylene oxides is optional and corresponds to the formula

 (IV)

$R^{6*}$ and $R^{7*}$ represent terminally unsaturated alkenyl radicals containing the same number and configuration of carbon atoms as the $R^6$ and $R^7$ groups, respectively and $R^9$ represents a monovalent hydrocarbon or substituted monovalent hydrocarbon radical selected from the same group as $R^1$. $R^9$ is most preferably methyl.

Following reaction with the copolymer of formula II the triorganosiloxy terminal groups of the polyethylene oxide units represented by formula III are converted to hydroxyl groups by reacting the copolymer with an excess of an alcohol such as methanol. These hydroxyl groups are then reacted with an organometallic compound such as an organolithium compound followed by reaction with acryloyl chloride or methacryloyl chloride to form the corresponding acrylic or metharylic acid ester.

As a rule the total number of moles of polyethylene oxides corresponding to formulae III and IV is approximately equal to the number of moles of silicon bonded hydrogen atoms present in the reaction mixture.

The reaction between the aforementioned organohydrogen-silixane homopolymer or copolymer and the polyethylene oxide(s) is conducted in the presence of a platinum-containing catalyst of the typically used for hydrosilation reactions. Halogen-containing platinum compounds such as hexachloroplatinic acid and complexes of these compounds with ethylenically unsaturated organosilicon compounds are preferred catalysts.

Because the polyorganosiloxane and the plyethylene oxides represented by formulae III and IV are incompatible it is usually desirable to include in the reaction mixture an organic liquid that is a solvent for all reactants and the final copolymer. Preferred solvents include but are not limited to liquid hydrocarbons such toluene and cyclic ethers such as tetrahydrofuran. To facilitate isolation of the final copolymer the solvent should be capable of being evaporated from the reaction mixture under reduced pressure at temperatures from about 20° to 30° C.

It is desirable to add small amounts of an anti-oxidant such as hydroquinone to the resultant reaction mixture to prevent premature curing of the copolymer by polymerization of the acrylate or methacrylate groups.

Specific reaction conditions for the preparation of preferred copolymers of this invention are described in the accompanying examples.

The radicals and numerical values represented by $R^1$, $R^2$, $R^3$, $R^{6*}$, $R^{7*}$, $R^8$, $R^9$, A, m, n, x, y, and z, in formulae II, III and IV are defined previously. The terminal group of the optional polyethylene oxide corresponding to the foregoing formula IV is represented by A, where A is defined as an alkyl or aryl radical or an acyl group represented by $R^{10}C(O)—$, where $R^{10}$ is an alkyl radical that preferably contains no more than 4 carbon atoms. Most preferably $R^{10}$ represents a methyl or ethyl radical.

In preferred embodiments of the present copolymers $R^{6*}$ and $R^{7*}$ are ethylene or propylene and A is preferably an alkyl radical or an acyl group and contains from 1 to 4 carbon atoms.

The silicon-bonded hydrocarbon and substituted hydrocarbon radicals represented by $R^1$, $R^2$ and $R^3$ preferably contain from one up to about 10 carbon atoms that can be arranged in linear or branched configurations. The radicals preferably are lower alkyl, lower haloalkyl or phenyl, this preference being based on the availability of the starting materials used to prepare the aforementioned diorganosiloxane/organohydrogensiloxane copolymer. Preferred radicals include but are not limited to alkyl radicals such as emthyl, ethyl and propyl, haloalkyl radicals such as 3,3,3-trifluoropropyl, cycloalkyl radicals such as cyclohexyl, aryl radicals such as phenyl and alkaryl radicals such as tolyl.

When the copolymers of this invention are used as electrolytes for solid state batteries in combination with a solubilized lithium salt the radicals represented by $R^1$, $R^2$ and $R^3$ are preferably methyl.

The values of m, n, x, y, and z in the formula for the present copolymers determine the viscosity of the copolymer and the crosslink density of the cured material. The value of x, representing the number of diorganosiloxane units present in the copolymer, can be from 0 up to 100, the value of y can be from 0 to 100, the value for z is at least 2, and the sum of x, y and z is at least 10. When this sum is less than 10 and the value of z is less than 2 the copolymer cannot be cured to form a solid material.

Preferably the values represented by x, y and z are from 0 to 35 for x, from 0 to 20 for y, from 4 to 12 for z, and the sum of x, y and z is from 10 to 50. Copolymers of this type exhibit a viscosity of less than 1 Pa.s at 25° C.

The polyethylene oxides represented by formulae III and IV each contain an average of from about 4 to about 20 repeating units per molecule, which represents the values assigned to m and n in the preceding formulae. This value is preferably between 4 and 12.

The electrical conductivity of the present copolymers is determined, at least in part, by the crosslink density of the copolymer. Crosslink density can be expressed in terms of the molecular weight of that portion of the copolymer molecule separating the ethylenically unsaturated terminal groups of adjacent polyethylene oxide chains represented by $R^5$ in the foregoing formula.

For the present copolymers the theoretical value for the molecular weight between crosslinks, referred to hereinafter as $MW_c$, is calculated by dividing the molecular weight of the copolymer by the average number of moles of $R^5$ units per molecule.

$MW_c$ values can be determined experimentally by measuring the carbinol group content of a copolymer wherein the $C(O)CR^8=CH_2$ group of the terminal group represented by $R^5$ is replaced by the hydroxyl group of the intermediate that is reacted with acryloyl- or methacryloyl chloride to obtain the $R^5$ group.

Experimental data demonstrates that for preferred copolymers useful conductivity values, typically greater than about $10^{-5}$ $(ohm\ cm.)^{-1}$, cannot be achieved at $MW_c$ values below about 1000. The conductivity reaches a maximum at an $MW_c$ value of about 1500 and remains at this maximum up to at least an $MW_c$ value of 10,000.

Copolymers with an $MW_c$ value of about about 3000 may not contain sufficient acrylate- or methacrylate terminated polyethylene oxide units to provide the crosslink density needed to form a solid cured material. In these instances an external crosslinking or curing agent such as a difunctional or trifunctional ester of acrylic or methacrylic acid must be used.

Examples of suitable external curing agents include but are not limited to ethylene glycol dimethacrylate and trimethylolpropane trimethacrylate.

The amount of lithium salt that can be dissolved in the copolymer is directly related to the total number of ethylene oxide units present in a given weight of copolymer, i.e. the values of m, n, y and z. Solubilization of one mole of the lithium salt requires from 7 to 30 moles of ethylene oxide $(—CH_2CH_2O—)$ units in the copolymer. Above a ratio of 30 moles of ethylene oxide units per mole of salt the conductivity of the copolymer decreases below a useful value.

The presence of the acryloxy or methacryloxy group allows curing of the copolymer to be initiated either by free radicals generated by the decomposition of organic peroxides or by irradiation with ultraviolet light or an electron beam. The use of curing reactions involving active hydrogen atoms can interfere with electrochemical reactions.

A preferred method for curing mixtures of the diorganosiloxane/graft-polyethylene oxide copolymers of this invention and a solubilized lithium salt is by exposing films or coatings formed from these mixtures to ultraviolet radiation in the presence of a photoinitiator. Suitable photoinitiators include but are not limited to aromatic ketones such as benzophenone, alkoxy substituted acetophenones such as diethoxyacetophenone and dimethoxyphenylacetophenone, benzil, and cationic initiators such as triaryl sulfonium-, diazonium- and phosphonium salts.

The exposure time and wavelength of the radiation required to cure the copolymer is dependent upon the type and concentration of photoinitiator, the thickness of the layer to be cured and the intensity of the ultraviolet radiation at the surface of the copolymer. Coatings and self-supporting films measuring up to about 2 mm. in thickness and formed from preferred lithium-containing copolymers of this invention are completely cured following exposures of one second or less to ultraviolet radiation. The films and coatings are cured by passing them under an ultraviolet lamp at speeds of from about 50 to about 100 feet per minute. The radiation dosage at the surface of the film or coating is preferably equivalent to from 50 to 200 millijoules per square cm.

The present copolymers containing solubilized lithium salts can also be cured by irradiating them with an electron beam or by heating int he presence of an organic peroxide or an azo compound. Suitable peroxides include benzoyl peroxide, bis(2,4-dichlorobenzoyl) peroxide and dicumyl peroxide. Suitable azo compounds include azo bis-isobutyronitrile. It will be understood that the temperature used to cure the copolymer must be above the decompositon temperature of the organic peroxide to azo compound. The peroxides are typically used at a concentration of from 0.2 to about 2 weight percent, based on the weight of the copolymer.

As disclosed hereinabove the present copolymers are particularly useful as electrolytes for solid state batteries. In this application from about 0.033 to about 0.14 mole of an ionizable lithium salt per mole of ethylene oxide ($-CH_2CH_2O-$) units in the copolymer is dissolved in the copolymer prior to curing. This concentration of salt is typically sufficient to achieve conductivity values of from $1 \times 10^{-6}$ to about $3 \times 10^{-5}$ (ohm cm.)$-1$ for the cured copolymer/salt composite.

Data in the accompanying examples demonstrate that a major factor affecting conductivity is the composition of the copolymer, particularly the crosslink density of the copolymer and the total concentration of ethylene oxide units. The composition of the copolymer will determine the molecular weight between crosslinks, referred to hereinbefore as $MW_c$.

It has been found that the concentration of lithium salt has some effect on the conductivity of a particular copolymer. Data in the accompanying examples demonstrate that for a particular copolymer the conductivity increases by a factor of about 2 in conductivity as the ratio of the number of moles of lithium salt to ethylene oxide units is increased from 0.05 to 0.08.

To facilitate solubilization of the salt it is preferably added to the copolymer as a solution in an non-aqueous liquid medium such as tetrahydrofuran.

Suitable lithium compounds include salts of acids having $pK_a$ values lower than about 3 and which are soluble in the present organosiloxane/ethylene oxide copolymers. Examples of suitable salts include but are not limited t salts of organosulfonic acids, phosphoric acid, thicyanic acid, and fluoralkyl-sulfonic acid, perchloric acid.

An advantage of the present copolymers is that curing of the copolymer is not inhibited to any significant extent by the presence of the ionizable lithium salt.

The following examples describe the preparation of preferred copolymers of this invention and their use in combination with solubilized, ionizable lithium salts as electrolytes in solid state batteries. Unless otherwise indicated all parts and percentages are by weight and viscosities were measured at 25+ C. The term polyethylene glycol used in the examples is synonymous with the term "polyethylene oxide" described int he preceding specification.

EXAMPLE 1

Preparation of $Me_3SiO(MeXSiO)_{38}(MeYSiO)_{12}SiMe_3$;
Me is methyl, X is
$CH_2CH_2CH_2(OCH_2CH_2)_{12}O(O)CCH_3$, and Y is
$CH_2CH_2CH_2(OCH_2CH_2)_{12}O(O)CCH=CH_2$ This example describes the preparation of a preferred copolymer of this invention. The terms "polyethylene glycol" and "polyethylene oxide" are used interchangeably.

A glass reactor equipped with a stirrer, water-cooled condenser and a nitrogen inlet was charged with 56.1 parts of a trimethylsiloxy-terminated polymethylhydrogensiloxane containing about 1.6 weight percent of silicon-bonded hydrogen, 580 parts of the allyl ether of a polyethylene glycol monoacetate exhibiting a degree of polymerization of 12, 42 parts of the trimethylsiloxy-terminated monoallyl ether of a polyethylene glycol exhibiting a degree of polymerization of 12, and 261 parts of dry toluene. The trimethylsiloxy-terminated polyethylene glycol was prepared by reacting the corresponding monoallyl ether with 1.5 moles of hexamethyldisilazane per mole of carbinol groups. The mixture was heated to a temperature just below the boiling point of the solvent.

The addition of 0.5 part of a 10 weight percent hexachloroplatinic acid solution in isopropanol to the solubilized mixture of the two plyethylene glycols and the organohydrogensiloxane resulted in an exothermic reaction that generated sufficient heat to raise the temperature of reaction mixture to the boiling point for several minutes. Following this period the reaction mixture was then heated to maintain it at the boiling point for two hours. The reaction mixture was then cooled to about 60° C., at which time 80 parts of methanol were added and heating was continued for an additional two hours. A portion of contents of the reactor were then distilled under ambient pressure until the temperature of the liquid in the reactor reached 140° C. The distillate was discarded. Any residual solvent or methanol was removed by heating the reaction mixture under a pressure of 5 torr until the temperature of the liquid reached 150° C.

A turbid liquid exhibiting a hydroxyl number of 7221.1 was obtained in 93 percent yield. 100 grams of this liquid and 25 cc tetrahydrofuran were charged into a glass reactor equipped with a stirrer, water cooled condenser and a nitrogen inlet. 14.4 cc of a 1.6 M solution of n-butyl lithium in hexane was then added to the reaction mixture through a syringe. A small amount of solid formed and the viscosity of the reaction mixture increased following the addition. 75 cc of tetrahydrofuran were then added, followed by 2.93 cc by acryloyl chloride by means of a syringe. After stirring at room temperature for 15 minutes 0.05 g of hydroquinone was added to stabilize the reaction product, following which the reaction mixture was concentrated under reduced pressure using a water bath at a temperature of 40°-50° C. to prevent freezing of the resultant copolymer of this invention.

A ten gram sample of the copolymer was blended with 5.42 g. of a 33.2 weight percent solution of lithium trifluoromethylsulfonate in tetrahydrofuran, equivalent to a polyethylene glycol/lithium molar ratio of 18. This mixture was then blended with 0.1 g of azo-bis-isobutyronitrile as a free radical initiator and molded for 30 minutes at a temperature of 85°-90° C. to yield a 1 mm-thick of cured, bubble-free conductive elastomer.

The electrical conductance of the molded film was measured in an enclosed shielded chamber under a nitrogen atmosphere at ambient temperature. The measuring apparatus consisted of a lower square stainless steel electrode having an edge dimension of 2.5 cm and an upper electrode in the form of a vertically oriented stainless steel rod having a circular cross-section measuring 0.315 cm$^2$ in area. The sample was placed between the two electrodes and in contact with the surface of each electrode.

The equipment used to measure the conductivity of the sample consisted of a Wavetek model 186 frequency generator set to provide an output of 1 volt$_{eff}$at frequencies of from 1 Hz to 100 kHz., a data acquisition and control box (model 3497A manufactured by Hewlett Packard Corporation), an IIEE 488 bus that connected the data acquisition/control box to a Hewlett Packard model 9920 series 200 computer and a model SR510 lock-in amplifier manufactured by Sanford Research Systems. The output of the frequency generator was connected to the lower electrode. The upper electrode was connected to the lock-in amplifier through a 1 ohm resistor. The lock-in amplifier also sampled the output of the frequency generator.

Considering the two electrodes as plates of a capacitor and the test sample as the dielectric, the conductivity of the sample was determined by applying the output of the frequency generator to the lower electrode. The current through the 1 ohm resistor and the phase angle between the voltage and the current were determined using the lock-in amplifier. This procedure was repeated at a number of different frequencies between 1 Hz and 100 kHz to provide a plot of the real component of the total impedance as the abscissa and the imaginary component as the ordinate as a function of frequency. Extending the plot to the point at which it intersected the abscissa at the point furthest from the ordinate yielded the purely resistive component (R) of the impedance. The resistivity (p) was then calculated from the geometry of the upper electrode using the formula $p = RA/d$, where A is the area of the upper electrode (0.315 cm$^2$) and d is the thickness of the sample, 0.1 cm. The conductivity of a sample is the reciprocal of its resistivity.

the conductivity value for sample 2 was $1.6 \times 10^{-5}$ (ohm-cm.)$^{-1}$.

EXAMPLE 2

This example demonstrates the effect of the molecular weight between crosslinks, referred to hereinbefore as $MW_c$, on the conductivity of various dimethylsiloxane/ethylene oxide copolymers. Ten copolymers of this invention were prepared and cured using the procedure described in Example 1. An additional two copolymers having $MW_c$ values below the scope of the present invention were prepared for purposes of comparison.

The trimethylsiloxy-terminated methylhydrogensiloxane homopolymer and dimethylsiloxane/methylhydrogensiloxane copolymers used as intermediates were prepared using known methods and are represented by the average formula Me$_3$SiO(Me$_2$SiO)$_x$(MeHSiO)$_{y+z}$SiMe$_3$.

The two types of allyl ether-terminated polyethylene oxides are represented by the general formulae $CH_2$=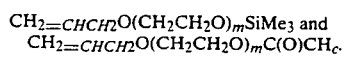$O(CH_2CH_2O)_m$SiMe$_3$ and
$CH_2$=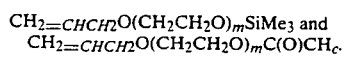$O(CH_2CH_2O)_mC(O)CH_c$.

The trimethylsiloxy-terminated polymer was used alone or in combination with a polyethylene oxide containing the same number of repeating units and an acetoxy terminal group. The molar ratio of the acetoxy-terminated polyethylene oxide to the trimethylsiloxy-terminated polyethylene oxide is represented by y/z in the following listing of reactants. The trimethylsiloxy group was converted to the acryloxy group using the procedure described in Example 1.

The siloxane polymers and the allyl ether-terminated polyethylene oxides used to prepare the samples evaluated in this example are identified as listed in Tables 1 and 2, the terms x, y, and z referring to the foregoing formulae.

The conductivity values of the ten samples of this invention and 3 controls, together with the molecular weight between crosslink sites ($MW_c$) are listed in Table 3.

TABLE 1
ORGANOHYDROGENSILOXANES

| Reactant Designation | x | y + z |
|---|---|---|
| A | 33.3 | 16.7 |
| B | 0 | 50 |
| C | 7.7 | 3.3 |
| D | 0 | 10 |
| E | 5 | 5 |
| F | 0 | 30 |
| G | 25 | 25 |
| H | 20 | 10 |
| I | 15 | 15 |

TABLE 2
POLYETHYLENE OXIDES

| Reactant Designation | m |
|---|---|
| K | 4 |
| L | 8 |
| M | 12 |

TABLE 3

| | Copolymer Composition | | | | | |
|---|---|---|---|---|---|---|
| | Siloxane | | Polyethylene Oxide(s) | | | |
| No. | Type | Grams | Type | —OSiMe$_3$ (g) | —OC(O)CH$_3$ (g) | y/z |
| 1 | A | 100 | L | 45 | 207 | 0.44/0.10 |
| 2 | B | 100 | L | 56.8 | 449.6 | 1.88/0.12 |
| 3 | C | 100 | L | 198 | 0 | 0/0.42 |
| 4 | D | 25 | L | 61.5 | 144 | 0.30/0.13 |
| 5 | E | 100 | M | 66.7 | 431.6 | 0.72/0.10 |
| 6 | K | 100 | M | 303 | 178.2 | 0.30/0.45 |
| 7 | H | 100 | M | 107.5 | 221 | 0.37/0.16 |
| 8 | F | 50 | M | 62.6 | 497 | 0.83/0.09 |
| 9 | I | 20 | K | 12.1 | 114 | 0.33/0.03 |
| 10 | J | 100 | M | 77 | 307.9 | 0.65/0.16 |
| 1C* | E | 31.2 | K | 11.2 | 77.8 | 0.22/0.03 |
| 2C* | E | 32.9 | K | 53.7 | 33.8 | 0.1/0.15 |
| 3C* | H | 42 | K | 24.3 | 53.7 | 0.15/0.07 |

* = Control Example

TABLE 4

| No. | $MW_c$ | Conductivity × 10$^5$ (ohm cm)$^{-1}$ |
|---|---|---|
| 1 | 3400 | 1.5 |
| 2 | 4500 | 1.3 |
| 3 | 1090 | 0.72 |
| 4 | 1040 | 0.32 |
| 5 | 6020 | 2.1 |
| 6 | 1290 | 0.42 |
| 7 | 2920 | 3.2 |
| 8 | 4760 | 2.3 |
| 9 | 1230 | 4.0 |
| 10 | 1670 | 2.4 |
| 1C | 930 | 0.092 |
| 2C | 540 | 0.0092 |
| 3C | 940 | 0.003 |

EXAMPLE 3

This example demonstrates the ability of the present copolymers to cure by exposure to ultra-violet radiation. A ten gram portion of the copolymer of this invention described in Example 1 was blended with 5.4 g. of a 33.3 weight percent solution of lithium trifluoromethanesulfonate in tetrahydrofuran. The tetrahydrofuran was removed under reduced pressure and 0.2 g. of 2-hydroxy-2-methyl-1-phenylpropan-1-one was added. The resultant liquid was coated as an approximately 0.1 mm-thick layer on an aluminum panel. The coated panel was then exposed to an amount of radiation from a medium pressure ultraviolet lamp equivalent to 36.5 millijoules/cm$^2$. The panel was passed twice under the lamp on a belt traveling at a speed of 55 feet (16.8) meters per minute. The belt was located 15 cm. below the lamp. The resultant cured coating was non-tacky and elastomeric.

EXAMPLE 4

This example demonstrates the effect of the molar ratio of lithium salt to ethylene oxide units on the conductivity of the cured elastomer. Four samples were prepared using the copolymer described in Example 1 and various amounts of lithium trifluoromethanesulfonate as a 33 percent solution in tetrahydrofuran. The amounts of lithium salt added were equivalent to a molar ratio of ethylene oxide (EO) to lithium salt (Li) of 12, 15, 18, and 21. Samples of each of these copolymers were prepared for conductivity measurements as described in the preceding Example 2. Conductivity measurements were conducted on these samples as described in Example 2 with the following results.

| EO/Li | Conductivity [$\times 10^{-5}$(ohm cm)$^{-1}$] |
|---|---|
| 12 | 1 |
| 15 | 1.4 |
| 18 | 1.6 |
| 21 | 1.8 |

EXAMPLE 5

This example demonstrates that compositions of this invention can be cured using an electron beam. A curable, electroconductive composition was prepared using the ingredients specified for sample 6 in table 3 of example 2. Test samples were prepared as described in example 1, with the exception that the azo-bis-isobutyronitrile was not added and the sample was cured by exposing it tot an electron beam produced by a Model EB-150 generator manufactured by Energy Sciences. The total dosage was between 3 and 4 megarads.

That which is claimed is:

1. A solid, electroconductive organosiloxane copolymer comprising the product obtained by curing a liquid composition comprising
   A. an organosiloxane copolymer having the general formula $R^1{}_3SiO(R^2{}_2SiO)_x(R^3R^4SiO)_y(R^3R^5SiO)_z SiR^1{}_3.$ where $R^1$, $R^2$, and $R^3$ monovalent hydrocarbon or substituted monovalent hydrocarbon radicals, $R^4$ represents —$R^6O(CH_2CH_2O)_mA$, $R^5$ represents —$R^7O(CH_2CH_2O)_nC(O)CR^8=CH_x$, $R^6$ and $R^7$ represent identical or different alkylene radicals containing from 2 by 12 carbon atoms, $R^8$ represents methyl or hydrogen, A represents an alkyl or aryl radical or an acyl group, the values represented by m and n are from 4 to 30, the value represented by x is from 0 to 100, the value represented by y is from 0 to 100, the value represented by z is at least 2, the value of x+y+z is equivalent to a viscosity of up to 1 Pa.s at 25° C., and
   B. an amount of a solubilized, ionizable lithium salt equivalent to one mole of said salt per 7 to 30 moles of $CH_2CH_2O$ units in said copolymer.

2. A composition according to claim 1 where $R^1$, $R^2$ and $R^3$ are methyl, phenyl or 3.3.3-trifluropropyl, $R^6$ and $R^7$ are ethylene or propylene, A represents an alkyl radical or an acyl group and contains from 1 to 4 carbon atoms, m and n are from 4 to 12, inclusive, x is from 0 to 35, inclusive, y is from 0 to 20, z is from 4 to 12, the total of x, y and z is from 10 to 50, and the lithium salt is a salt of an organosulfonic acid, fluoroalkylsulfonic acid, phosphiric acid, perchloric acid or lithium thiocyanate.

3. A composition according to claim 2 where $R^1$, $R^2$ and $R^3$ are methyl, $R^8$ i hydrogen, A is acetyl, and the lithium salt is a salt of fluoroalkylsulfonic acid.

4. A solid cured electroconductive coating according to claim 1 prepared by applying said liquid composition to a metal substrate and curing said composition by exposing it to ultraviolet radiation or to an electron beam.

* * * * *